US009313783B2

(12) United States Patent
Zhu

(10) Patent No.: US 9,313,783 B2
(45) Date of Patent: Apr. 12, 2016

(54) ENHANCING COORDINATED MULTI-POINT PROCESSING TRANSMISSION THROUGH RESOURCE ELEMENT MUTING

(71) Applicant: Fujitsu Limited, Kanagawa (JP)

(72) Inventor: Chenxi Zhu, Fairfax, VA (US)

(73) Assignee: CA, Inc., New York, NY (US)

( * ) Notice: Subject to any disclaimer, the term of this patent is extended or adjusted under 35 U.S.C. 154(b) by 287 days.

(21) Appl. No.: 13/732,945

(22) Filed: Jan. 2, 2013

(65) Prior Publication Data

US 2014/0016536 A1    Jan. 16, 2014

Related U.S. Application Data

(60) Provisional application No. 61/670,860, filed on Jul. 12, 2012.

(51) Int. Cl.
| | |
|---|---|
| *H04W 72/04* | (2009.01) |
| *H04B 7/02* | (2006.01) |
| *H04B 7/155* | (2006.01) |
| *H04L 5/00* | (2006.01) |

(52) U.S. Cl.
CPC ........... *H04W 72/0426* (2013.01); *H04B 7/024* (2013.01); *H04B 7/15542* (2013.01); *H04L 5/0035* (2013.01); *H04W 72/0406* (2013.01); *H04L 5/005* (2013.01)

(58) Field of Classification Search
CPC .................................................. H04W 72/0406
USPC ........................................................... 370/315
See application file for complete search history.

(56) References Cited

U.S. PATENT DOCUMENTS

| | | | |
|---|---|---|---|
| 2011/0243009 A1 | 10/2011 | Chandrasekhar et al. | |
| 2013/0058234 A1 | 3/2013 | Yang et al. | |

FOREIGN PATENT DOCUMENTS

| | | | | |
|---|---|---|---|---|
| KR | 101150846 | 6/2012 | ............... | H04B 7/26 |

OTHER PUBLICATIONS

International Search Report and Written Opinion; PCT/US2013/041759; pp. 16, Jan. 30, 2014.
3GPP TS36.211 v10.5.0 (2012-19); "Evolved Universal Terrestrial Radio Access (E-UTRA). Physical Channels and Modulation"; (Release 10); pp. 106, Sep. 2012.

(Continued)

*Primary Examiner* — Robert M Morlan
*Assistant Examiner* — Kevin Lee
(74) *Attorney, Agent, or Firm* — Baker Botts L.L.P.

(57) ABSTRACT

A system and method of signal transmission in a wireless communications network is disclosed. A coordinated transmission is transmitted from a plurality of base stations, each including a transmission point. Each transmission point is configured to transmit a cell specific reference signal in a particular set of resource elements. Additionally, a determination is made regarding which of the plurality of base stations will serve as a lead base station in the coordinated transmission and data is mapped to all available resource elements in a physical resource block, except the resource elements in which the lead base station is configured to transmit a cell-specific reference signal. Further, each remaining base station is instructed to mute transmissions in the particular set of resource elements in which the corresponding transmission point is configured to transmit a cell specific reference signal.

12 Claims, 3 Drawing Sheets

Example resource element allocation

CRS1 transmitted by TP1

CRS2 transmitted by TP2

CRS3 transmitted by TP3

PDSCH RE or DM-RS

(56) References Cited

OTHER PUBLICATIONS

3GPP T S36.312 v11.0.0 (Sep. 2012); "Evolved Universal Terrestrial Radio Access (E-UTRA). Multiplexing and channel coding"; (Release 10); pp. 79.

Invitation to Pay Additional Fees and Partial Search Report; PCT/US2013/041759; pp. 7, Oct. 30, 2013.

NTT DOCOMO; "Investigation of Specification Impact for Rel. 11 CoMP"; 3GPP TSG RAN WG1 Meeting #66; Athens, Greece; pp. 5, 2011.

US 9,313,783 B2

ENHANCING COORDINATED MULTI-POINT PROCESSING TRANSMISSION THROUGH RESOURCE ELEMENT MUTING

RELATED APPLICATION

This application claims benefit under 35 U.S.C. §119(e) of U.S. Provisional Patent Application No. 61/670,860, entitled "Enhancing Coordinated Multi-Point Processing Transmission Through Resource Element Muting" and filed 12 Jul. 2012, which is hereby incorporated by reference.

TECHNICAL FIELD

This disclosure relates generally to communication networks and, more particularly, to wireless communication networks.

BACKGROUND

Long-Term Evolution-Advanced (LTE-A) may become the dominant standard for fourth-generation (4G) wireless technology. The current version of the LTE-A standard is Release 11 (Rel. 11), and a particular feature of Rel. 11 is Coordinated Multi-point Processing (CoMP). Multiple-input/multiple-output (MIMO) transmission is an important feature of LTE-A. Down link (DL) CoMP is a special type of MIMO transmission in which the multiple transmission antennas of one or more transmission points transmit to receiver antennas located on the user equipment (UE).

SUMMARY

In one embodiment, a method of signal transmission in a wireless communications network is disclosed. A coordinated transmission is transmitted from a plurality of base stations, each including a transmission point. Each transmission point is configured to transmit a cell specific reference signal in a particular set of resource elements. Additionally, a determination is made regarding which of the plurality of base stations will serve as a lead base station in the coordinated transmission and data is mapped to all available resource elements in a physical resource block, except the resource elements in which the lead base station is configured to transmit a cell-specific reference signal. Further, each remaining base station is instructed to mute transmissions in the particular set of resource elements in which the corresponding transmission point is configured to transmit a cell specific reference signal.

In another embodiment, a system for transmitting signals in a wireless communications network, is disclosed. The system includes a plurality of base stations, one of which serves as a lead base station, and a plurality of transmission points, each of which is associated with one of the plurality of base stations and configured to transmit a cell-specific reference signal in a particular set of resource elements. The lead base station is configured to map data to all available resource elements in a physical resource block except the resource elements in which the lead base station is configured to transmit a cell-specific reference signal, and instruct each remaining base stations to mute all transmissions in the particular set of resource elements in which the transmission point associated with that base station is configured to transmit a cell specific reference signal.

In yet another embodiment, a system for transmitting signals in a relay network is disclosed. The system includes a source node configured to transmit data to at least one user device and a relay node configured to transmit data in a particular set of resource elements. The source node is further configured to mute transmissions in all resource elements other than the particular set of resource elements.

The object and advantages of the invention will be realized and achieved by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Particular embodiments and their advantages are best understood by reference to FIGS. 1 through 4, wherein like numbers are used to indicate like and corresponding parts.

This disclosure sets forth methods and systems for improving the transmission quality in a wireless network through Resource Element (RE) muting. Additionally, this disclosure sets forth methods and systems for enhancing Long-Term Evolution-Advanced (LTE-A) Down link (DL) Coordinated Multi-point Processing (CoMP) joint transmissions through Resource Element (RE) muting.

Figure 1:
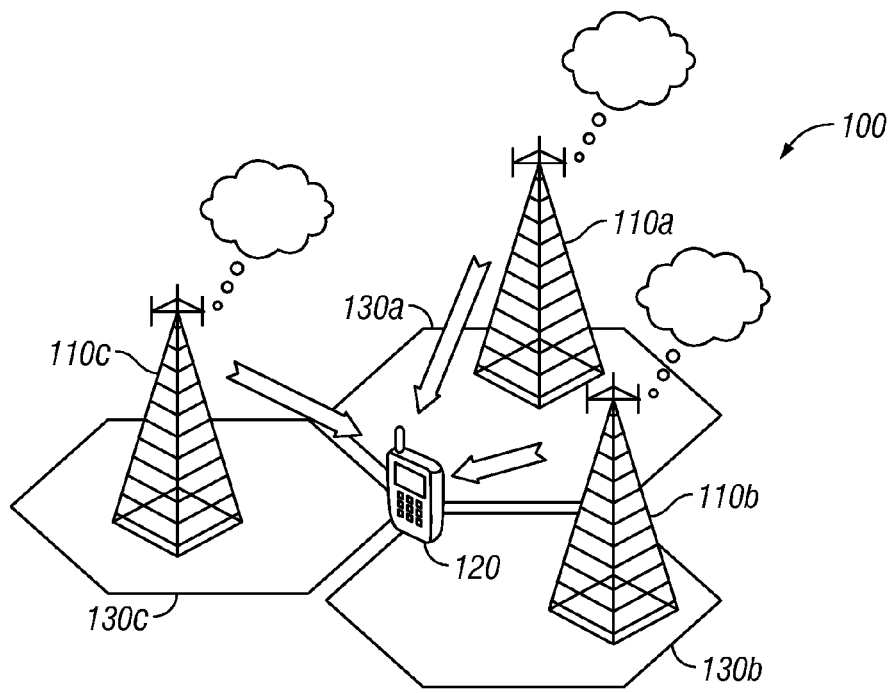
FIG. 1 illustrates a diagram of an example wireless communications network in accordance with one embodiment of the present disclosure.

FIG. 1 illustrates an example wireless communications network 100 in accordance with the present disclosure. Wireless communications network 100 may be a Code Division Multiple Access (CDMA) network, a Global System for Mobile Communications (GSM) network, a Long-Term Evolution (LTE) network, an LTE-A network, or a combination of two or more such networks. Wireless communications network 100 may include base stations 110*a*, 110*b*, and 110*c* and mobile device 120. Although FIG. 1 depicts three base stations 110*a*, 110*b*, and 110*c*, wireless communications network 100 may include any suitable number of base stations 110. Similarly, wireless communications network 100 may include any suitable number of mobile devices 120 that communicate with base stations 110.

Base stations 110 may be referred to as Node B for 3rd generation (3G) cellular networks (e.g., Universal Mobile Telecommunications Systems or UMTS networks) or evolved Node B (eNB) for an LTE network. As shown in FIG. 1, base stations 110*a*, 110*b*, and 110*c* may be located in adjacent cells 130*a*, 130*b*, and 130*c*, respectively. Cells 130 may have any suitable shape.

Base stations 110 may include any combination of hardware, software embedded in a computer readable medium, and/or encoded logic incorporated in hardware or otherwise stored (e.g., firmware) to implement any number of communication protocols that allow for wired or wireless exchange of packets in wireless communication network 100. Base stations 110 may include one or more antennas, which may also be referred to as transmission points. Transmission points may be any suitable type of antenna capable of transmitting and receiving data or signals wirelessly. For example, transmission points may include omni-directional, sector, or panel antennas operable to transmit/receive radio signals at any suitable frequency, such as between 2 GHz and 66 GHz. Each transmission point may provide wireless coverage to a particular building, city block, neighborhood, or any other geographic area. In some embodiments, transmission points may be located remotely from base stations 110, but may nonetheless function as an extension of base stations 110.

Base stations 110 may communicate with mobile device 120 via wireless communication through the one or more transmission points. Base stations 110 may communicate with mobile device 120 using a variety of different wireless technologies, including, but not limited to, orthogonal frequency division multiple access (OFDMA) and the LTE-A protocol as defined in the 3rd Generation Partnership Project (3GPP) Release 10 or beyond.

Mobile device 120 may be a portable computer or computing device including functionality for communicating over a network. For example, mobile device 120 may be a mobile phone, a tablet computer, a laptop computer, a handheld game console, an electronic book reader, or any other suitable portable device. Mobile device 120 may also be referred to as user equipment (UE). Mobile device 120 may connect to wireless communications network 100 via one or more base stations 110 of wireless communications network 100. Communications between mobile device 120 and wireless communications network 100 may be single-point to single-point (e.g., between one or more antennas of a single base station 110 and one or more antennas of mobile device 120). Alternatively, communications between mobile device 120 and wireless communications network 100 may be multi-point to single-point (e.g., between one or more antennas of multiple base stations 110 and one or more antennas of mobile device 120).

Multi-point to single-point transmissions may be accomplished through down link coordinated multi-point processing (DL CoMP), which is a type of multiple-input/multiple-output (MIMO) transmission wherein multiple transmitting antennas are located at multiple geographically separated locations. For example, data for mobile device 120 may be available at multiple geographically separated points in wireless communications network 100. The data may be transmitted to mobile device 120 at the same time through coordination among the multiple transmission points. For example, in a joint transmission involving three base stations 110, there may be multiple transmission points that transmit to mobile device 120 simultaneously in the same physical resource block. In each joint transmission, one of the base stations 110 may be designated as the lead, or controlling, base station 110. The lead base station 110 may coordinate the transmissions from the base stations 110 participating in the joint transmission, encode the data to be transmitted to mobile device 120, and send the encoded data to the transmission points participating in the joint transmission.

Figure 2:
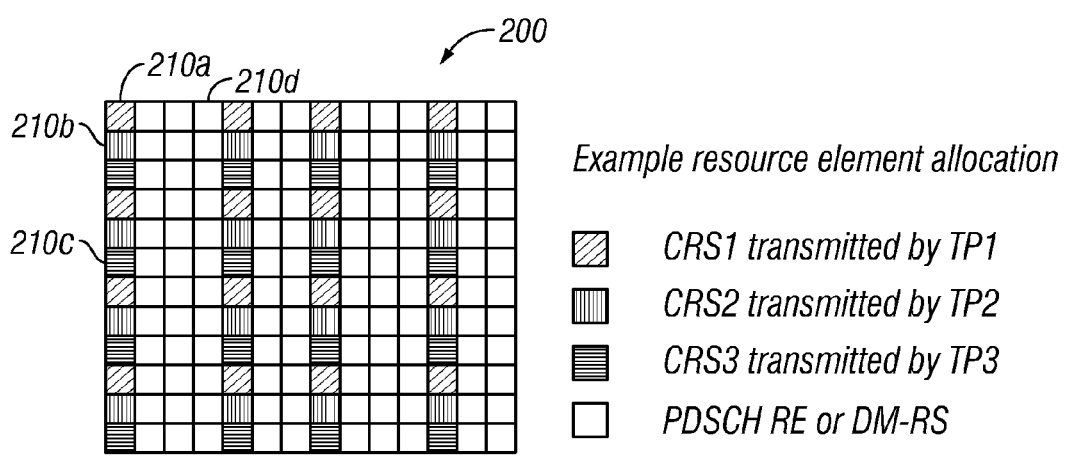
FIG. 2 illustrates a diagram of an example of the allocation of resource elements of a radio frame in accordance with one embodiment of the present disclosure.

FIG. 2 illustrates an example physical resource block 200 in accordance with the present disclosure. As shown in FIG. 2, a physical resource block 200 may include a plurality of resource elements 210 of a radio head, which may be a base station 110 or other transmission point. In an LTE-A communication scheme, twelve contiguous subcarrier frequencies each transmitting six or seven data symbols in a given amount of time may form a physical resource block. A data symbol may be a complex number with real or imaginary components that map a group of bits to one or more modulation characteristics of a carrier wave transmitted at a particular subcarrier frequency.

Various types of information may be sent to or from mobile device 120 via the resource elements of physical resource block 200. For example, one or more base stations 110, each having a transmission point, may send data traffic and control traffic to mobile device 120. Data traffic may, for example, include information that a base station 110 receives from wireless communication network 100 or from another base station 110. As an example only, data traffic may be sent to mobile device 120 via a physical downlink shared channel (PDSCH), as defined in the LTE-A protocol, via resource elements 210d. In certain embodiments, resource elements 210d may also be used to transmit demodulation reference signals (DM-RS), which are discussed in further detail below.

Data traffic may be distinguished from control traffic, which is used to establish and maintain a connection between one or more transmission points and mobile device 120. Control traffic may include information that allows mobile device 120 to extract relevant data traffic from transmissions sent from base stations 110. For example, control traffic may include cell-specific reference signals (CRS) transmitted by a transmission point associated with each base station. Each base station 110a, 110b, and 110c may, for example, include a transmission point TP1, TP2, and TP3, respectively. As shown in FIG. 2, each transmission point may transmit its own CRS. The particular set of resource elements in which each transmission point transmits CRS may be fixed. For example, TP1 may transmit a first CRS (CRS1) in resource elements 210a, TP2 may transmit a second CRS (CRS2) in resource elements 210b, and TP3 may transmit a third CRS (CRS3) in resource elements 210c.

In certain embodiments, each transmission point may also transmit demodulation reference signals (DM-RS) in resource elements 210d. Mobile device 120 may use the DM-RS from each transmission point to estimate the channel on which data is being transmitted to mobile device 120. Once mobile device 120 has estimated the channel, it may determine a precoding matrix for that channel. The precoding matrix may be selected from a predefined codebook that includes a plurality of precoding matrices. Mobile device 120 may then calculate the effective channel. In a joint transmission with three transmission points, the effective channel may be represented by the following equation:

$$D = \sum_{k=1}^{3} H_k W_k$$

where H is the estimated channel for each transmission point and W is the precoding matrix for each transmission point. If mobile device 120 is not aware of all the transmission points involved in the joint transmission, the mobile device may not be able to properly calculate the effective channel, which may result in an error decoding the transmitted data. For example, if mobile device 120 is not aware that TP2 and TP3 are involved in the joint transmission, it will attempt to treat the resource elements designated for CRS2 and CRS3 as data and decode the CRS signals. This may result in a decoding error and thus data loss.

To avoid this problem, mobile device 120 may be notified of the transmission points involved in the joint transmission. Such notification signals, however, may result in the use of excessive downlink control information overhead. To both minimize the use of downlink control information overhead and avoid a decoding error, transmissions may be muted in the set of resource elements where a particular transmission point is configured to transmit a CRS.

Consider, for example, a joint transmission involving three base stations 110a, 110b, and 110c, with each base station 110 having a transmission point TP1, TP2, and TP3, respectively, and base station 110a designated as the lead base station. Each of the transmission points TP1, TP2, and TP3 may be configured to transmit a CRS in a particular set of resource elements.

An encoder of lead base station 110a may encode the data to be transmitted to mobile device 120 and map the encoded bits of data into modulation symbols, each of which may be transmitted on an available resource element. Lead base station 110a may map encoded bits of data to all available resource elements except those designated for CRS1. The resource elements designated for CRS1 are not mapped because they may be used to transmit CRS to mobile device 120.

Although the lead base station 110a may map encoded bits to the resource elements designated for CRS2 and CRS3, lead base station 110a may identify the particular resource elements in which TP2 and TP3 are configured to transmit CRS and instruct base stations 110b and 110c (1) not to map encoded bits to the resource elements designated for CRS1, and (2) not to transmit the encoded bits mapped by lead base station 110a to the resource elements designated for CRS2 and CRS3. Thus, all transmissions in the particular set of resource elements designated for CRS2 and CRS3, respectively, will be muted. Mobile device 120 may still attempt to decode using the muted resource elements, but may not experience a coding error because no signal will be transmitted at the muted resource elements.

A similar process may be followed if a base station other than base station 110a were designated as the lead base station in the joint transmission. Consider, for example, a joint transmission involving base stations 110a, 110b, and 110c, with each base station 110 having a transmission point TP1, TP2, and TP3, respectively, and base station 110b designated as the lead base station. An encoder of lead base station 110b may encode the data to be transmitted to mobile device 120 and map the encoded bits of data into modulation symbols, each of which may be transmitted on an available resource element. Lead base station 110b may map encoded bits of data to all available resource elements except those designated for CRS2. The resource elements designated for CRS2 are not mapped because they may be used to transmit CRS to mobile device 120.

Although the lead base station 110b may map encoded bits to the resource elements designated for CRS1 and CRS3, lead base station 110b may identify the particular resource elements in which TP1 and TP3 are configured to transmit CRS and instruct base stations 110a and 110c (1) not to map encoded bits to the resource elements designated for CRS2, and (2) not to transmit the encoded bits mapped by lead base station 110b to the particular set of resource elements designated for CRS1 and CRS3, respectively.

Figure 3:
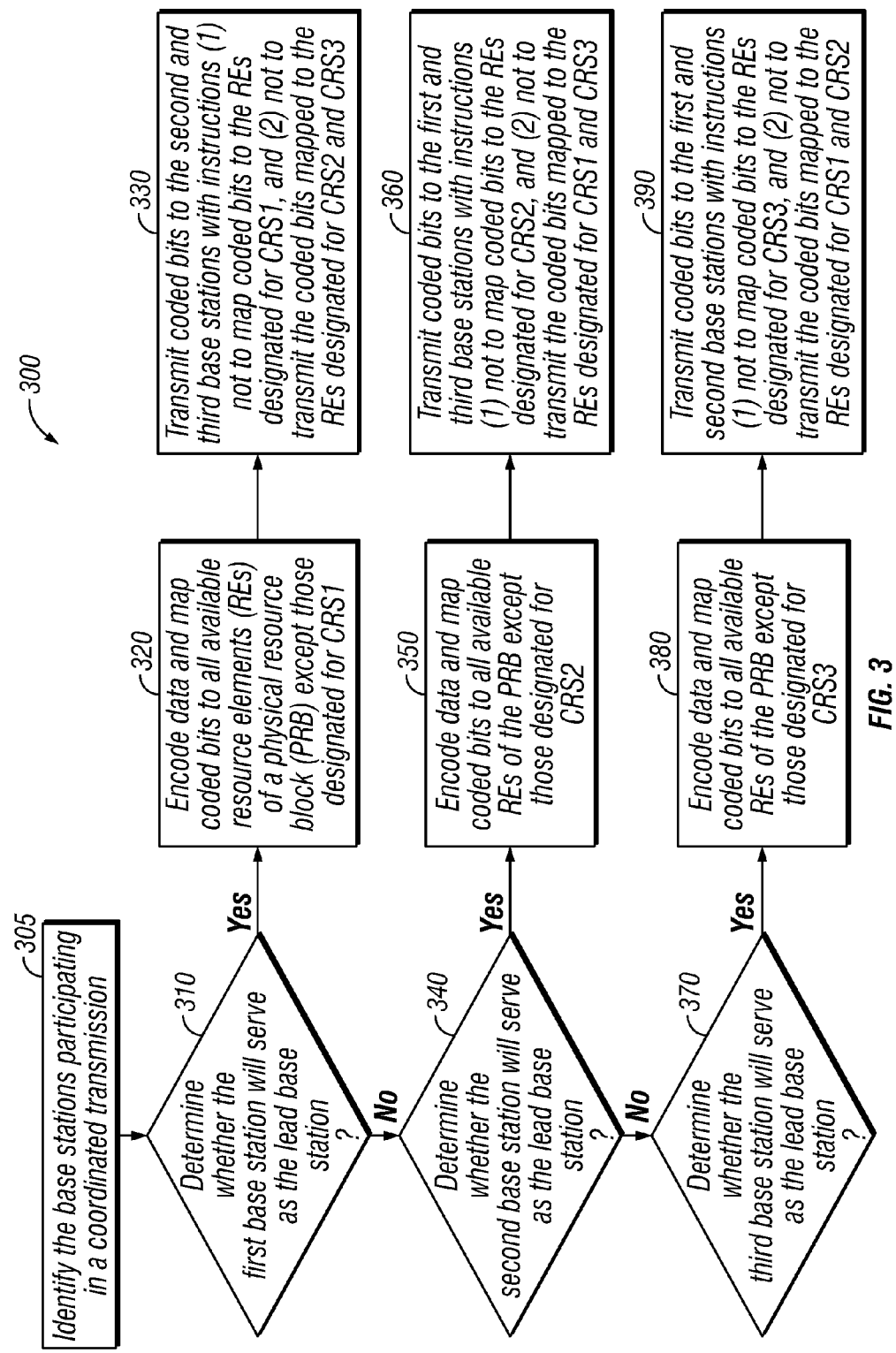
FIG. 3 illustrates a flow chart of an example method for signal transmission in a wireless communications network in accordance with one embodiment of the present disclosure.

FIG. 3 illustrates a flow chart of an example method 300 for signal transmission in a wireless communication network including three base stations and three corresponding transmission points involved in a joint transmission. Each of the three transmission points may be configured to transmit a cell-specific reference signal, CRS1, CRS2, and CRS3, respectively. Although method 300 is illustrated with three base stations, the method may be implemented for a system including any number of base stations.

At step 305, the wireless communication network may identify the base stations participating in a coordinated transmission. At step 310, the wireless communication network may determine whether a first base station will act as the lead base station in the transmission. As discussed above, one of the base stations involved in a coordinated transmission may control and/or coordinate the transmission. If the first base station will act as the lead base station in the transmission, the method may proceed to step 330. At step 330, an encoder of the first base station may encode the data to be transmitted and map the encoded bits to all the available resource elements in the physical resource block except those designated for CRS1. As discussed above, the resource elements designated for the CRS signal associated with the lead base station are not mapped because they may be used to transmit CRS to mobile device 120. At step 340, the first base station may send the encoded bits to the second and third base stations with instructions (1) not to map encoded bits to the resource elements designated for CRS1, and (2) not to transmit the encoded bits that are mapped by the first base station to the resource elements designated for CRS2 and CRS3. Thus, the second and third transmission points will be effectively muted at the resource elements designated for CRS2 and CRS3.

If, on the other hand, the first base station will not act as the lead base station, the method may proceed to step 340. At step 340, the wireless communication network may determine whether a second base station will act as the lead base station in the transmission. If so, the method may proceed to step 350. At step 350, an encoder of the second base station may encode the data to be transmitted and map the encoded bits to all the available resource elements in the physical resource block except those designated for CRS2. As discussed above, the resource elements designated for the CRS signal associated with the lead base station are not mapped because they may be used to transmit CRS to mobile device 120. At step 360, the second base station may send the encoded bits to the first and third base stations with instructions (1) not to map encoded bits to the resource elements designated for CRS2, and (2) not to transmit the encoded bits that are mapped by the second base station to the resource elements designated for CRS1 and CRS3. Thus, the first and third transmission points will be effectively muted at the resource elements designated for CRS1 and CRS3.

If neither the first base station, nor the second base station will act as the lead base station in the transmission, the method may proceed to step 370. At step 370, the wireless communication network may determine whether a third base station will act as the lead base station in the transmission. If so, the method may proceed to step 380. At step 380, an encoder of the third base station may encode the data to be transmitted and map the encoded bits to all the available resource elements in the physical resource block except those designated for CRS3. As discussed above, the resource elements designated for the CRS signal associated with the lead base station are not mapped because they may be used to transmit CRS to mobile device 120. At step 390, the third base station may send the encoded bits to the first and second base stations with instructions (1) not to map encoded bits to the resource elements designated for CRS3, and (2) not to transmit the encoded bits that are mapped by the third base station to the resource elements designated for CRS1 and CRS2.

Thus, the first and second transmission points will be effectively muted at the resource elements designated for CRS1 and CRS2.

Figure 4:
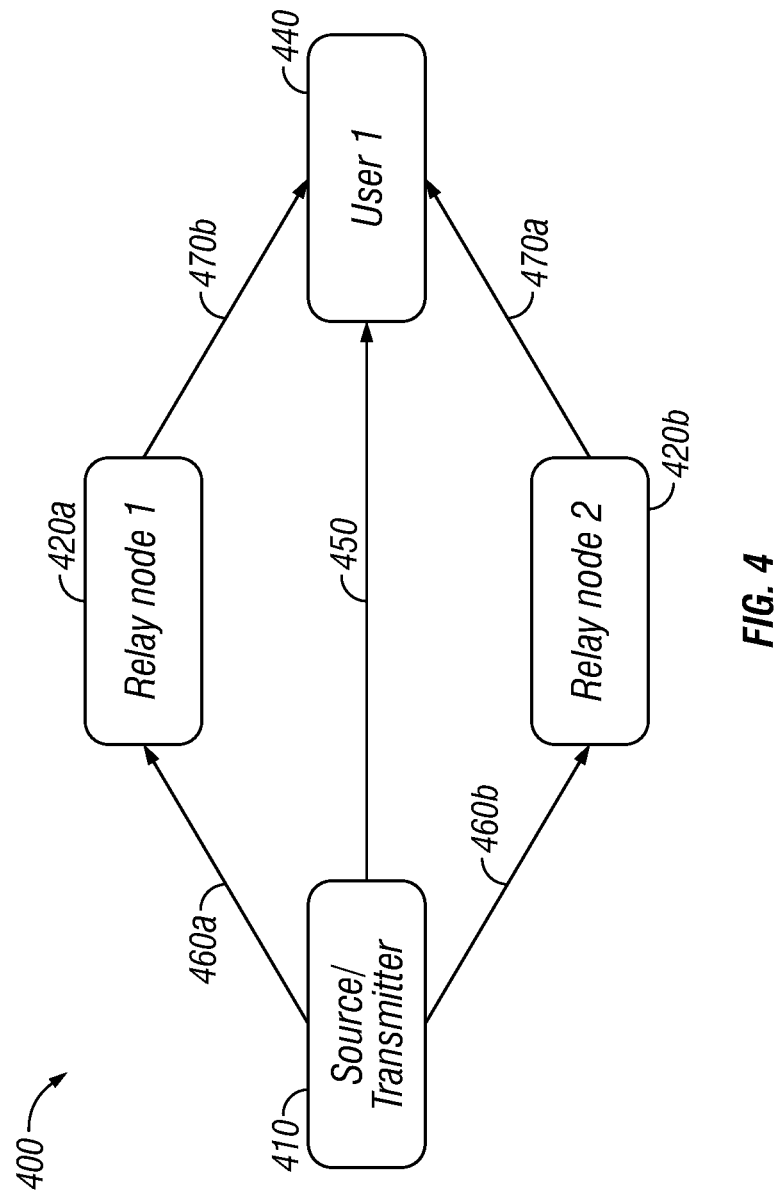
FIG. 4 illustrates a diagram of an example relay network in accordance with the present disclosure in accordance with one embodiment the present disclosure.

The teachings of this disclosure may also be applied to signal transmission in a dynamic relay network. FIG. 4 illustrates a diagram of an example relay network 400 in accordance with the present disclosure in accordance with the present disclosure. Relay network 400 may include a source node 410, relay nodes 420a and 420b, and user device 440.

Source node 410 may, for example, be a base station. Source node 410 may include any combination of hardware, software embedded in a computer readable medium, and/or encoded logic incorporated in hardware or otherwise stored (e.g., firmware) to implement any number of communication protocols that allow for wired or wireless exchange of packets in relay network 400. Additionally, source node 410 may include a transmission point capable of transmitting and receiving data or signals wirelessly. Source node 410 may be communicatively coupled to user device 440 via direct access link 450. Source node 410 may also be communicatively coupled to relay nodes 420a and 420b via relay links 460a and 460b, respectively.

Relay nodes 420a and 420b may include any combination of hardware, software embedded in a computer readable medium, and/or encoded logic incorporated in hardware or otherwise stored (e.g., firmware) to implement any number of communication protocols that allow for wired or wireless exchange of packets in relay network 400. Relay nodes 420a and 420b may be communicatively coupled to user device 440 via cooperative links 470a, 470b, or 470c.

User device 440 may be a portable computer or computing device including functionality for communicating over a network. For example, user device 440 may be a mobile phone, a tablet computer, a laptop computer, a handheld game console, an electronic book reader, or any other suitable portable device. User device 440 may connect to relay network 400 via direct access links 450 and/or cooperative links 470a and 470b.

Relay nodes 420 may be used to assist in the transmission of data from source node 410 to user device 440. Source node 410 may determine whether to transmit data to user device 440 directly via direct access link 450 or indirectly via relay node 420a or relay node 420b. When utilized to transmit data to user device 440, a relay node 420 transmit data in the same resource elements as source node 410, but the relay node 420 may not be able to transmit in all the resource elements where the source node 410 transmits. Additionally, relay nodes 420a and 420b may use a different precoding matrix than source node 410. Each node in the relay network (e.g., source node 410, relay node 420a, and relay node 420b) may transmit a reference signal such as, for example, a DM-RS.

To properly decode transmitted data, user device 440 may need to estimate a composite channel based on reference signals from all the nodes involved in the data transmission. For example, if data is transmitted to user device 440 from source node 410 via relay node 420, channel estimation should be based on the reference signals of both source node 410 and relay node 420. Because relay nodes 420 may be unable to transmit in all the resource elements used by source node 410, user device 440 may be unable to properly estimate the channel because it may receive reference signals from only source node 410 in some resource elements. If user device 440 is unable to properly estimate the channel, it may experience a decoding error. To avoid a decoding error, source node 410 may mute all transmissions in the resource elements in which relay node 420 cannot transmit. Thus, in all resource elements where user device 440 receives a reference signal, it will receive reference signals from both source node 410 and relay node 420.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present invention have been described in detail, it should be understood that the various changes, substitutions, and alterations could be made hereto without departing from the spirit and scope of the invention.

What is claimed is:

1. A method of signal transmission in a wireless communications network, the method comprising:
   transmitting a coordinated transmission from a plurality of base stations, each including a transmission point, wherein each of the transmission points is configured to transmit a cell-specific reference signal in a particular set of resource elements;
   determining which of the plurality of base stations will serve as a lead base station in the coordinated transmission;
   mapping data to all available resource elements in a physical resource block except the resource elements in which the lead base station is configured to transmit a cell-specific reference signal; and
   instructing, by the lead base station, each remaining base station to mute transmissions in the particular set of resource elements in which the corresponding transmission point is configured to transmit a cell specific reference signal, the instructing including instructing each remaining base station not to map encoded bits to the resource elements designated for the lead base station and not to transmit the encoded bits mapped by the lead base station to the resource elements designated for each remaining base station.

2. The method of claim 1, wherein the plurality of base stations comprises:
   a first base station including a first transmission point configured to transmit a first cell-specific reference signal in a first set of resource elements;
   a second base station including a second transmission point configured to transmit a second cell-specific reference signal in a second set of resource elements; and
   a third base station including a third transmission point configured to transmit a third cell-specific reference signal in a third set of resource elements.

3. The method of claim 2, further comprising:
   if the first base station is the lead base station:
      mapping data to all available resource elements in the physical resource block except the first set of resource elements; and
      instructing the second base station and third base station to mute transmissions in the second set of resource elements and the third set of resource elements;
   if the second base station is the lead base station:
      mapping data to all available resource elements in the physical resource block except the second set of resource elements; and
      instructing the first base station and third base station to mute transmissions in the first set of resource elements and the third set of resource elements; and if the third base station is the lead base station:
    mapping data to all available resource elements in the physical resource block except the third set of resource elements; and
    instructing the first base station and second base station to mute transmissions in the first set of resource elements and the second set of resource elements.

4. The method of claim 1, wherein the coordinated transmission comprises a dynamic point selection transmission, a coordinated scheduling/coordinated beamforming transmission, or a joint transmission.

5. The method of claim 1, wherein each of the plurality of base stations is located in a cell adjacent at least one of the plurality of base stations.

6. A system for transmitting signals in a wireless communications network, the system comprising:
    a plurality of base stations, wherein one of the plurality of base stations serves as a lead base station; and
    a plurality of transmission points, each of the transmission points associated with one of the plurality of base stations and configured to transmit a cell-specific reference signal in a particular set of resource elements;
    wherein the lead base station is configured to:
        map data to all available resource elements in a physical resource block except the resource elements in which the lead base station is configured to transmit a cell-specific reference signal; and
        instruct each remaining base station to mute all transmissions in the particular set of resource elements in which the transmission point associated with that base station is configured to transmit a cell specific reference signal, the instructing including instructing each remaining base station not to map encoded bits to the resource elements designated for the lead base station and not to transmit the encoded bits mapped by the lead base station to the resource elements designated for each remaining base station.

7. The system of claim 6, wherein the plurality of base stations comprises:
    a first base station including a first transmission point configured to transmit a first cell-specific reference signal in a first set of resource elements;
    a second base station including a second transmission point configured to transmit a second cell-specific reference signal in a second set of resource elements; and
    a third base station including a third transmission point configured to transmit a third cell-specific reference signal in a third set of resource elements.

8. The system of claim 7, wherein:
    if the first base station is the lead base station, the first base station is further configured to:
        map data to all available resource elements in the physical resource block except the first set of resource elements; and
        instruct the second base station and third base station to mute all transmissions in the second set of resource elements and the third set of resource elements;
    if the second base station is the lead base station, the second base station is configured to:
        map data to all available resource elements in the physical resource block except the second set of resource elements; and
        instruct the first base station and third base station to mute all transmissions in the first set of resource elements and the third set of resource elements; and
    if the third base station is the lead base station, the third base station is configured to:
        map data to all available resource elements in the physical resource block except the third set of resource elements; and
        instruct the first base station and second base station to mute all transmissions in the first set of resource elements and the second set of resource elements.

9. The system of claim 6, wherein the plurality of base stations transmit a coordinated transmission.

10. The system of claim 9, wherein the coordinated transmission comprises a dynamic point selection transmission, a coordinated scheduling/coordinated beamforming transmission, or a joint transmission.

11. The system of claim 8, wherein each of the plurality of base stations is located in a cell adjacent one of the plurality of base stations.

12. The system of claim 7, wherein:
    the first base station is located in a cell adjacent the second base station or the third base station;
    the second base station is located in a cell adjacent the first base station or the third base station; and
    the third base station is located in a cell adjacent the first base station or the second base station.

* * * * *